United States Patent
Fujioka et al.

(10) Patent No.: US 11,084,977 B2
(45) Date of Patent: Aug. 10, 2021

(54) CERAMIC COMPLEX AND METHOD FOR PRODUCING THE SAME

(71) Applicant: NICHIA CORPORATION, Anan (JP)

(72) Inventors: Naoto Fujioka, Tokushima (JP); Tadayoshi Yanagihara, Tokushima (JP); Keisuke Suzuki, Anan (JP); Hiroshi Ogasa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 160 days.

(21) Appl. No.: 16/553,263

(22) Filed: Aug. 28, 2019

(65) Prior Publication Data

US 2020/0071606 A1 Mar. 5, 2020

(30) Foreign Application Priority Data

Aug. 29, 2018 (JP) .............................. JP2018-160830

(51) Int. Cl.
| | | |
|---|---|---|
| *C09K 11/02* | (2006.01) | |
| *C09K 11/77* | (2006.01) | |
| *C04B 41/00* | (2006.01) | |
| *C04B 35/645* | (2006.01) | |
| *C04B 35/117* | (2006.01) | |

(52) U.S. Cl.
CPC ............ *C09K 11/02* (2013.01); *C04B 35/117* (2013.01); *C04B 35/6455* (2013.01); *C04B 41/0072* (2013.01); *C09K 11/7774* (2013.01); *C04B 2235/3222* (2013.01); *C04B 2235/661* (2013.01); *C04B 2235/662* (2013.01); *C04B 2235/725* (2013.01); *C04B 2235/728* (2013.01); *C04B 2235/77* (2013.01); *C04B 2235/9646* (2013.01)

(58) Field of Classification Search
CPC ... C09K 11/02; C09K 11/7774; C04B 35/117; C04B 35/6455; C04B 41/0072; C04B 2235/3222; C04B 2235/662; C04B 2235/661; C04B 2235/725; C04B 2235/728; C04B 2235/77; C04B 2235/9646
See application file for complete search history.

(56) References Cited

U.S. PATENT DOCUMENTS

| | | |
|---|---|---|
| 8,940,390 B2 | 1/2015 | Irie et al. |
| 9,045,691 B2 | 6/2015 | Irie |
| 9,862,648 B2 | 1/2018 | Mortier et al. |
| 2012/0045634 A1 | 2/2012 | Irie et al. |
| 2013/0256599 A1 | 10/2013 | Irie |
| 2017/0015591 A1 | 1/2017 | Mortier et al. |

FOREIGN PATENT DOCUMENTS

| | | |
|---|---|---|
| JP | 2000-044330 A | 2/2000 |
| JP | 2010235388 A | 10/2010 |
| JP | 2011012215 A | 1/2011 |
| JP | 2012062459 A | 3/2012 |
| JP | 2013209245 A | 10/2013 |
| JP | 2013227481 A | 11/2013 |
| JP | 2014-234487 A | 12/2014 |
| JP | 2015030662 A | 2/2015 |
| JP | 2016204561 A | 12/2016 |
| JP | 2016204563 A | 12/2016 |
| JP | 2017518253 A | 7/2017 |

*Primary Examiner* — C Melissa Koslow
(74) *Attorney, Agent, or Firm* — Hunton Andrews Kurth LLP

(57) ABSTRACT

Provided are a ceramic complex having high light emission intensity and a method for producing the same. Proposed is a ceramic complex, including a rare earth aluminate fluorescent material having a composition represented by the following formula (I) and an aluminum oxide, wherein the content of the aluminum oxide is 70% by mass or more, the content of Na is 7 ppm by mass or less, the content of Si is 5 ppm by mass or less, the content of Fe is 3 ppm by mass or less, and the content of Ga is 5 pm by mass or less, relative to the total amount of the rare earth aluminate fluorescent material having a composition represented by the following formula (I) and the aluminum oxide.

$$(Ln_{1-a}Ce_a)_3Al_5O_{12} \quad (I)$$

wherein Ln represents at least one element selected from the group consisting of Y, Gd, Lu, and Tb; and a satisfies $0 < a \leq 0.022$.

8 Claims, 4 Drawing Sheets

CERAMIC COMPLEX AND METHOD FOR PRODUCING THE SAME

CROSS-REFERENCE TO RELATED PATENT APPLICATION

This application claims priority to Japanese Patent Application No.2018-160830, filed on Aug. 29, 2018, the disclosure of which is hereby incorporated reference in its entirety.

BACKGROUND

Technical Field

The present disclosure relates to a ceramic complex that converts a wavelength of light emitted from a light emitting diode (hereinafter also referred to as "LED") or a laser diode (hereinafter also referred to as "LD"), and a method for producing the same.

Description of Related Art

Light emitting devices employing LEDs as light emitting elements are being utilized as an alternative to light sources such as incandescent lamps and fluorescent lamps because such light emitting devices are light sources having high conversion efficiencies, consuming less power, having long lifetime, and capable of being miniaturized. The light emitting devices employing LEDs have been utilized not only in the field of illumination, such as interior illumination and on-vehicle illumination, but also in broad fields of backlights for liquid crystal displays, decorative lighting. In particular, light emitting devices that emit mixed light generated by the combination of light emitting elements and fluorescent materials, are being widely used. In this specification, the "fluorescent material" is used in the same meaning as a "fluorescent phosphor".

Examples of known fluorescent materials used in the light emitting devices include a rare earth aluminate fluorescent material in which the composition is represented by (Y,Gd,Tb,Lu)$_3$(Al,Ga)$_5$O$_{12}$:Ce, a silicate fluorescent material represented by (Sr,Ca,Ba)$_2$SiO$_4$:Eu, and a Ca-α-SiAlON fluorescent material. As a member that contains such an inorganic fluorescent material and converts a wavelength of light emitted from a light emitting element, for example, Japanese Unexamined Patent Publication No. 2014-234487 discloses a ceramic complex obtained by mixing an inorganic material powder such as glass and an inorganic fluorescent material powder and melting the inorganic material powder, followed by solidifying.

However, in regard to the ceramic complex disclosed in Japanese Unexamined Patent Publication No. 2014-234487, further improvements are required in light emission intensity Thus, an embodiment of the present disclosure has an object to provide a ceramic complex having high light emission intensity and a method for producing the same.

SUMMARY

Means for further improving the requirement include the following embodiments.

A first embodiment of the present disclosure is a ceramic complex comprising a rare earth aluminate fluorescent material having a composition represented by the following formula (I), and an aluminum oxide, $$(Ln_{1-a}Ce_a)_3Al_5O_{12} \quad (I)$$

wherein Ln represents at least one element selected from the group consisting of Y, Gd, Lu, and Tb; and a satisfies 0<a≤0.022, wherein a content of the aluminum oxide is 70% by mass or more relative to a total amount of the rare earth aluminate fluorescent material having a composition represented by the formula (I) and the aluminum oxide, and wherein a content of Na is 7 ppm by mass or less, a content of Si is 5 ppm by mass or less, a content of Fe is 3 ppm by mass or less, and a content of Ga is 5 pm by mass or less, relative to a total amount of the rare earth aluminate fluorescent material having a composition represented by the formula (I) and the aluminum oxide.

A second embodiment of the present disclosure is a method for producing a ceramic complex, comprising: preparing a molded body containing a rare earth aluminate fluorescent material having a composition represented by the following formula (I) and an aluminum oxide, wherein a content of Na in the aluminum oxide is 7 ppm by mass or less, a content of Si in the aluminum oxide is 5 ppm by mass or less, a content of Fe in the aluminum oxide is 3 ppm by mass or less, and a content of Ga in the aluminum oxide is 5 ppm by mass or less; and calcining the molded body at a temperature in a range of 1,200° C. or more and 1,800° C. or less to obtain a sintered body.

$$(Ln_{1-a}Ce_a)_3Al_5O_{12} \quad (I)$$

wherein Ln represents at least one element selected from the group consisting of Y, Gd, Lu, and Tb; and a satisfies 0<a≤0.022.

In accordance with the embodiments of the present disclosure, a ceramic complex having high light emission intensity and a method for producing the same can be provided.

DETAILED DESCRIPTION

Figure 1:
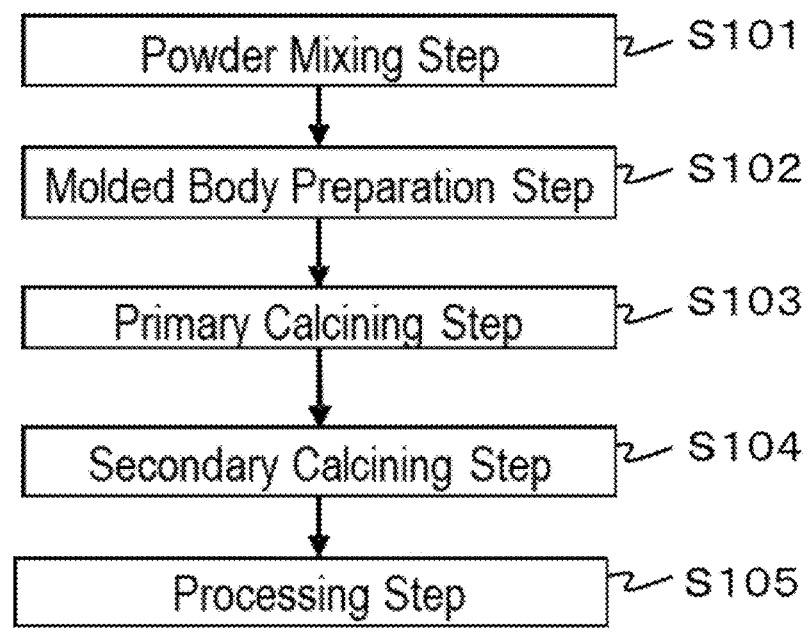
FIG. 1 is a flowchart describing an order of process steps of a method for producing a ceramic complex according to a first embodiment of the present disclosure.

The ceramic complex and the method for producing the same according to the present disclosure are hereunder described on the basis of embodiments. The embodiments shown below are exemplifications for embodiments the technical idea of the present disclosure, and the present disclosure is not limited to the ceramic complex and the method for producing the same mentioned below. Standards according to Japanese Industrial Standard (JIS) Z8110 are applied to the relations between color names and chromaticity coordinates, the relations between wavelength ranges of light and color names of monochromatic lights.

Ceramic Complex

The ceramic complex according to the present disclosure contains a rare earth aluminate fluorescent material having a composition represented by the following formula (I) and an aluminum oxide, wherein the content of the aluminum oxide is 70% by mass or more, the content of Na is 7 ppm by mass or less, the content of Si is 5 ppm by mass or less, the content of Fe is 3 ppm by mass or less, and the content of Ga is 5 pm by mass or less, relative to the total amount of the rare earth aluminate fluorescent material having a composition represented by the formula (I) and the aluminum oxide.

$$(Ln_{1-a}Ce_a)_3Al_5O_{12} \qquad (I)$$

wherein Ln represents at least one element selected from the group consisting of Y, Gd, Lu, and Tb; and a satisfies $0<a\leq 0.022$.

In the composition represented by the formula (I), the element represented by Ln is at least one element selected from the group consisting of Y, Gd, Lu, and Tb, and two or more elements may be contained in the composition represented by the formula (I). In the composition represented by the formula (I), Ln preferably represents at least one element selected from the group consisting of Y, Gd, and Lu.

In the composition represented by the formula (I), the parameter a represents the activation amount of Ce, and the product of the parameter a and 3 is a molar ratio of Ce in 1 mol of the rare earth aluminate fluorescent material having a composition represented by the formula (I). In the present specification, the "molar ratio" expresses a molar ratio of each element in 1 mol of the chemical composition represented by the formula (I). The parameter a is in a range of more than 0 and 0.022 or less ($0<a\leq 0.022$), and preferably in a range of 0.0001 or more and 0.020 or less ($0.0001<a\leq 0.020$), more preferably in a range of 0.0002 or more and 0.015 or less ($0.0002<a\leq 0.015$), even more preferably in a range of 0.0002 or more and 0.012 or less ($0.0002<a\leq 0.012$), still more preferably in a range of 0.0003 or more and 0.012 or less ($0.0003<a\leq 0.012$). In the composition represented by the formula (I), when the value of the parameter a, which is the activation amount of Ce, is 0, no light emission occurs due to the absence of the element serving as a light emission center in the crystal structure. When the value of the parameter a exceeds 0.022, the concentration quenching occurs due to the too large amount of the activation element, resulting in a tendency of decrease in the light emission intensity.

The rare earth aluminate fluorescent material preferably has an average particle diameter in a range of 1 μm or more and 50 μm or less, more preferably in a range of 1 μm or more and 40 μm or less, even more preferably in a range of 2 μm or more and 40 μm or less, still more preferably in a range of 2 μm or more and 20 μm or less, particularly preferably in a range of 2 μm or more and 18 μm or less. When the average particle diameter of the rare earth aluminate fluorescent material is in a range of 1 μm or more and 50 μm or less, a ceramic complex, in which the fluorescent material is substantially uniformly disposed by substantially uniformly dispersing in a molded body composed of a mixture obtained by mixing rare earth aluminate fluorescent material particles and aluminum oxide particles, can be obtained. The average particle diameter of the rare earth aluminate fluorescent material means a particle diameter (median diameter) where the volume cumulative frequency from the small diameter side measured by a laser diffraction scattering particle size distribution measuring method reaches 50%. In the ceramic complex, for example, the surfaces of the aluminum oxide particles are fusion bonded to each other to form a base material composed of the aluminum oxide, and the rare earth aluminate fluorescent material can be contained in the base material of the aluminum oxide in the state where the grain boundaries can be clearly confirmed.

The content of the rare earth aluminate fluorescent material in the ceramic complex is in a range of 0.1% by mass or more and 30.0% by mass or less, and preferably in a range of 0.5% by mass or more and 25.0% by mass or less, more preferably in a range of 1.0% by mass or more and 20.0% by mass or less, even more preferably 18.0% by mass or less. When the content of the rare earth aluminate fluorescent material in the ceramic complex is in a range of 0.1% by mass or more and 30.0% by mass or less, a ceramic complex having a desired light emission intensity can be obtained. The mass ratio (% by mass) of the rare earth aluminate fluorescent material in the ceramic complex is, when the total amount of the rare earth aluminate fluorescent material and the aluminum oxide particles is defined as 100% by mass, the same as the blending ratio (% by mass) of the rare earth aluminate fluorescent material to a total amount of a mixed powder obtained by mixing the rare earth aluminate fluorescent material and the aluminum oxide particles.

As for the ceramic complex, in a base material composed of the aluminum oxide, the rare earth aluminate fluorescent material which is distinguished from the aluminum oxide constituting the base material by the grain boundaries may exist. The ceramic complex may be constituted through integration of the aluminum oxide with the rare earth aluminate fluorescent material.

The content of the aluminum oxide in the ceramic complex is 70.0% by mass or more, and preferably 75.0% by mass or more, more preferably 80.0% by mass or more, even more preferably 82.0% by mass or more; and preferably 99.9% by mass or less, more preferably 99.5% by mass or less, even more preferably 99.0% by mass or less relative to a total amount of the rare earth aluminate fluorescent material having a composition represented by the formula (I) and the aluminum oxide. As for the aluminum oxide in the ceramic complex, the surfaces of the aluminum oxide particles are melted, and the surfaces of the particles are fusion bonded to each other, thereby constituting a base material of the ceramic complex. When the content of the aluminum oxide in the ceramic complex is less than 70.0% by mass, the amount of the aluminum oxide constituting the base material becomes small, and thus the strength of the ceramic complex may decrease and the relative density may decrease. When the content of the aluminum oxide in the ceramic complex is 70.0% by mass or more, the strength required for the ceramic complex can be obtained, and the relative density is increased. Further, when the content of the aluminum oxide in the ceramic complex is 99.9% by mass or less, the rare earth aluminate fluorescent material is contained, and a desired light emission intensity can be obtained. The content (% by mass) of the aluminum oxide in the ceramic complex is, when the total amount of the rare earth aluminate fluorescent material and the aluminum oxide particles is defined as 100% by mass, the same as the blending ratio (% by mass) of the aluminum oxide to a total amount of a mixed powder obtained by mixing the rare earth aluminate fluorescent material and the aluminum oxide particles.

The aluminum oxide preferably has a purity of 99.6% by mass or more, more preferably 99.7% by mass or more. When the purity of the aluminum oxide is 99.6% by mass or more, reaction with the fluorescent material contained in the ceramic complex is suppressed due to the small amounts of organic substances and moisture contained in the aluminum oxide, and a ceramic complex having high light emission intensity can be provided. In the case of using a commercially available aluminum oxide, the purity of the aluminum oxide can refer to the value described in the catalog. In the case where the purity of the aluminum oxide is unknown, the purity (% by mass) of the aluminum oxide can be determined by measuring a mass of the aluminum oxide; calcining the aluminum oxide, for example, at 800° C. for 1 hour in an atmospheric atmosphere to remove organic substances adhering to the aluminum oxide and moisture absorbed in the aluminum oxide; measuring a mass of the calcined aluminum oxide; and dividing the mass of the calcined aluminum oxide by the mass of the un-calcined aluminum oxide. The purity of the aluminum oxide can be, for example, calculated according to the following calculation formula (a).

Purity (% by mass) of aluminum oxide =(Mass of aluminum oxide particles after calcining ÷Mass of aluminum oxide particles before calcining)× 100        (a)

The aluminum oxide particles preferably have an average particle diameter in a range of 0.2 μm or more and 1.3 μm or less, more preferably in a range of 0.2 μm or more and 1.0 μm or less, even more preferably in a range of 0.3 μm or more and 0.8 μm or less, still more preferably in a range of 0.3 μm or more and 0.6 μm or less. When the average particle diameter of the aluminum oxide particles is in a range of 0.2 μm or more and 1.3 μm or less, the rare earth aluminate fluorescent material powder and the aluminum oxide particles can be uniformly mixed. As for the ceramic complex produced by using the uniformly mixed powder, the rare earth aluminate fluorescent material is substantially uniformly disposed in the ceramic complex, the whole density becomes uniform, and the relative density can be increased. In the present specification, the average particle diameter of the aluminum oxide particles means a particle diameter (median diameter) where the volume cumulative frequency from the small diameter side measured by a laser diffraction scattering particle size distribution measuring method reaches 50%. In the ceramic complex, the surfaces of the aluminum oxide particles serving as the raw material are melted, and the aluminum oxide particles are fusion bonded to each other in the state where the grain boundaries of the aluminum oxide particles can be confirmed through observation with a scanning electron microscope (SEM), thereby constituting a base material of the ceramic complex.

In the ceramic complex according to the present disclosure, the content of Na is 7 ppm by mass or less, and preferably 5 ppm by mass or less, more preferably less than 5 ppm by mass, relative to the total amount of the rare earth aluminate fluorescent material having a composition represented by the formula (I) and the aluminum oxide. The content of Fe in the ceramic complex is 3 ppm by mass or less, and preferably 2 ppm by mass or less, more preferably less than 2 ppm by mass, relative to the total amount of the rare earth aluminate fluorescent material having a composition represented by the formula (I) and the aluminum oxide. In the ceramic complex, when the content of Na is 7 ppm by mass or less and the content of Fe is 3 ppm by mass or less relative to the total amount, discoloration to black or brown on a part of or the whole of the body color of the ceramic complex can be suppressed, and lowering of the light emission intensity can be thus suppressed. Each of the contents of Na, Fe, Si, and Ga in the ceramic complex can be measured using an inductively coupled plasma atomic emission spectroscopy (ICP-AES, manufactured by, for example, PerkinElmer Inc.) according to the quantitative analysis of elements after melting the ceramic complex with phosphate while heating.

Although the mechanism for changing a part of or the whole of the body color of the ceramic complex to black or brown is not clarified, Fe and Na can be detected when the quantitative analysis of elements is performed using the inductively coupled plasma atomic emission spectroscopy (ICP-AES) after melting the part where the body color of the ceramic complex is changed to black or brown with an acid solution. The Fe element may be detected even at the part where the body color of the ceramic complex is not changed to black or brown. And in such a case, even if Fe element is detected, the body color of the ceramic complex may not be changed to black or brown. The amount of the Na element larger than that of the Fe element is detected, along with the presence of the Fe element, at the part where the body color of the ceramic complex is changed to black or brown. Thus, it is presumed that the Na element is aggregated at the part where the Fe element exists, and the body color of the ceramic complex is changed to black or brown.

In the ceramic complex, the content of Si is 5 ppm by mass or less, and preferably less than 5 ppm by mass, relative to the total amount of the rare earth aluminate fluorescent material having a composition represented by the formula (I) and the aluminum oxide. Since Si contained in the ceramic complex readily reacts with the rare earth aluminate fluorescent material and a rare earth silicate represented by, for example, $Ln_2SiO_5$ or $Ln_2Si_2O_7$ is generated by reacting Si with the rare earth aluminate fluorescent material, the light emission intensity is decreased. Here, Ln in the composition of the rare earth silicate represented by $Ln_2SiO_5$ or $Ln_2Si_2O_7$ represents at least one rare earth element selected from the group consisting of Y, Gd, Lu, and Tb. The content of Si in the ceramic complex is 5 ppm by mass or less relative to the total amount of the rare earth aluminate fluorescent material having a composition represented by the formula (I) and the aluminum oxide, and thus generation of the rare earth silicate caused by reacting Si with the rare earth aluminate fluorescent material can be suppressed. Also, lowering of the light emission intensity of the ceramic complex caused by reacting Si with the rare earth aluminate fluorescent material can be suppressed.

In the ceramic complex, the content of Ga is 5 ppm by mass or less, and preferably less than 5 ppm by mass, relative to the total amount of the rare earth aluminate fluorescent material having a composition represented by the formula (I) and the aluminum oxide. When the content of Ga in the ceramic complex is 5 ppm by mass or less relative to the total amount, replacement of aluminum contained in the rare earth aluminate fluorescent material with Ga can be suppressed, and the color tone change of the light of which the wavelength is converted with the fluorescent material in the ceramic complex can be thus suppressed. When the amount of Al of the rare earth aluminate fluorescent material in the ceramic complex to be replaced with Ga is large, the light emission peak wavelength of the light of which the wavelength is converted with the fluorescent material in the ceramic complex is shifted to a short wavelength side, and the color tone of the light of which the wavelength is converted with the fluorescent material is changed.

When the ceramic complex according to the present disclosure contains a rare earth aluminate fluorescent material represented by the formula (I) and an aluminum oxide, the content of the aluminum oxide is 70% by mass or more, the content of Na is 7 ppm by mass or less, the content of Si is 5 ppm by mass or less, the content of Fe is 3 ppm by mass or less, and the content of Ga is 5 pm by mass or less, relative to the total amount of the rare earth aluminate fluorescent material having a composition represented by the formula (I) and the aluminum oxide, the light emission intensity can be enhanced and the wavelength of incident light can be converted to that of light having a desired color tone.

The ceramic complex may contain, in addition to the rare earth aluminate fluorescent material and the aluminum oxide, a substance that does not hinder light conversion by the rare earth aluminate fluorescent material and transmits light. The substance that may be contained in the ceramic complex, other than the rare earth aluminate fluorescent material and the aluminum oxide, preferably has a comparatively high thermal conductivity. When the substance is contained in the ceramic complex, heat dissipation of the ceramic complex can be improved. Examples of the substance capable of transmitting light may include a substance containing at least one of MgO, LiF, $Nb_2O_5$, NiO, $SiO_2$, $TiO_2$, and $Y_2O_3$. The substance capable of transmitting light may contain two or more substances selected from the group consisting of MgO, LiF, $SiO_2$, $TiO_2$, and $Y_2O_3$. The substance, other than the rare earth aluminate fluorescent material and the aluminum oxide, also preferably has a content of Na of 7 ppm by mass or less, a content of Si of 5 ppm by mass or less, a content of Fe of 3 ppm by mass or less, and a content of Ga of 5 ppm by mass or less in the substance.

When the ceramic complex contains the substance capable of transmitting light other than the rare earth aluminate fluorescent material and the aluminum oxide, the total amount of the substance capable of transmitting light and the aluminum oxide is 70.0% by mass or more, and preferably 75.0% by mass or more, more preferably 80.0% by mass or more, even more preferably 82.0% by mass or more; and preferably 99.9% by mass or less, more preferably 99.5% by mass or less, even more preferably 99.0% by mass or less, relative to the total amount of the rare earth aluminate fluorescent material having a composition represented by the formula (I) and the aluminum oxide and the substance capable of transmitting light. The mass ratio of the aluminum oxide to the substance capable of transmitting light (aluminum oxide: substance capable of transmitting light) is preferably in a range of 1:99 to 99:1, more preferably in a range of 10:90 to 90:10, even more preferably in a range of 20:80 to 80:20.

The ceramic complex preferably has a relative density of 99.0% or more. The relative density of the ceramic complex is more preferably 99.5% or more, even more preferably 99.7% or more, still more preferably 99.8% or more. The relative density of the ceramic complex may be 100%, or may be 99.9% or less. When the relative density of the ceramic complex is 99.0% or more, the light emission intensity can be increased.

Relative Density of Ceramic Complex

In the present specification, the relative density of the ceramic complex refers to a value calculated by an apparent density of the ceramic complex relative to a true density of the ceramic complex. The relative density is calculated according to the following calculation formula (1).

$$\text{Relative density (\%) of ceramic complex} = \quad (1)$$
$$(\text{Apparent density of ceramic complex} \div \text{True density of ceramic complex}) \times 100$$

When a mass ratio (% by mass) of the rare earth aluminate fluorescent material contained in the ceramic complex is defined as $P_m$, a true density (g/cm$^3$) of the rare earth aluminate fluorescent material is defined as $P_d$, a mass ratio (% by mass) of the aluminum oxide contained in the ceramic complex is defined as $A_m$, and a true density (g/cm$^3$) of the aluminum oxide is defined as $A_d$, the true density of the ceramic complex is calculated according to the following calculation formula (2).

$$\text{True density of ceramic complex} = \frac{P_d \times A_d \times 100}{(A_d \times P_m) + (P_d \times A_m)} \quad (2)$$

Mass ratio (% by mass) of rare earth aluminate fluorescent material: $P_m$
True density (g/cm$^3$) of rare earth aluminate fluorescent material: $P_d$
Mass ratio (% by mass) of aluminum oxide: $A_m$
True density (g/cm$^3$) of aluminum oxide: $A_d$
$P_m + A_m = 100\%$ by mass The apparent density of the ceramic complex refers to a value obtained by dividing the mass (g) of the ceramic complex by the volume (cm$^3$) of the ceramic complex determined by the Archimedes' method. The apparent density of the ceramic complex is calculated according to the following calculation formula (3).

$$\text{Apparent density of ceramic complex} = \quad (3)$$
$$\text{Mass (g) of ceramic complex}$$
$$\div \text{Volume (cm}^3\text{) of cermaic complex (Archimedes' method)}$$

Method for Producing Ceramic Complex

The method for producing a ceramic complex according to a first embodiment includes: preparing a molded body containing a rare earth aluminate fluorescent material having a composition represented by the formula (I) and an aluminum oxide in which the content of Na is 7 ppm by mass or less, the content of Si is 5 ppm by mass or less, the content of Fe is 3 ppm by mass or less, and the content of Ga is 5 ppm by mass or less; primary calcining the molded body to obtain a first sintered body; and secondary calcining the first sintered body by applying a hot isostatic pressing (HIP) treatment to obtain a second sintered body.

FIG. 1 is a flowchart describing one example of a step order of the method for producing a ceramic complex according to the first embodiment. Steps in the method for producing a ceramic complex will be described by reference to FIG. 1. The method for producing a ceramic complex includes a molded body preparation step S102, a primary calcining step S103, and a secondary calcining step S104. The method for producing a ceramic complex may include a powder mixing step S101 prior to the molded body preparation step S102, and may include a processing step S105 of processing the second sintered body after the secondary calcining step S104.

Powder Mixing Step

In the powder mixing step, powders constituting a molded body are mixed to obtain a mixed powder. The powders constituting a molded body contain the rare earth aluminate fluorescent material particles and the aluminum oxide particles in which the content of Na is 7 ppm by mass or less, the content of Si is 5 ppm by mass or less, the content of Fe is 3 ppm by mass or less, and the content of Ga is 5 ppm by mass or less. Each of the contents of Na, Fe, Si, and Ga in the aluminum oxide can be measured using an inductively coupled plasma atomic emission spectroscopy (ICP-AES)

according to the quantitative analysis of each element. When the content of Na is 7 ppm by mass or less, the content of Si is 5 ppm by mass or less, the content of Fe is 3 ppm by mass or less, and the content of Ga is 5 ppm by mass or less in the aluminum oxide contained in the molded body, reaction between the rare earth aluminate fluorescent material contained in the ceramic complex and Si or Ga is suppressed, discoloration of the body color is suppressed, and as a result, a ceramic complex having high light emission intensity can be obtained. In the aluminum oxide, the content of Na is preferably 5 ppm by mass or less, more preferably less than 5 ppm by mass; the content of Si is preferably less than 5 ppm by mass; the content of Fe is preferably 2 ppm by mass or less, more preferably less than 2 ppm by mass; and the content of Ga is preferably less than 5 ppm by mass. The purity of the aluminum oxide is preferably 99.6% by mass or more, more preferably 99.7% by mass or more, in the same manner as the purity of the aluminum oxide contained in the ceramic complex. When the purity of the aluminum oxide is 99.6% by mass or more, a ceramic complex having high light emission intensity can be obtained.

The powders can be mixed using a mortar with a pestle. The powders may also be mixed using a mixing medium, such as a ball mill. A small amount of a molding auxiliary, such as water or ethanol, may also be used to facilitate mixing of the powders and molding of the mixed powder. The molding auxiliary is preferably evaporated easily in the subsequent step of calcining. In the case of adding the molding auxiliary, the amount of the molding auxiliary is preferably 10% by mass or less, more preferably 8% by mass or less, even more preferably 5% by mass or less, relative to 100% by mass of the powder.

Molded Body Preparation Step

In the molded body preparation step, the mixed powder containing the rare earth aluminate fluorescent material and the aluminum oxide is molded into a desired shape to obtain a molded body. The content of the aluminum oxide in the molded body is preferably 70.0% by mass or more relative to the total amount of the molded body, and more preferably 75.0% by mass or more, even more preferably 80.0% by mass or more, still more preferably 82.0% by mass or more; and more preferably 99.9% by mass or less, even more preferably 99.5% by mass or less, still more preferably 99.0% by mass or less. When the content of the aluminum oxide in the molded body is 70.0% by mass or more, a ceramic complex having a desired strength and high relative density can be obtained. In addition, when the content of the aluminum oxide in the molded body is 99.9% by mass or less, the rare earth aluminate fluorescent material can be contained in the balance, and a ceramic complex having a desired light emission intensity can be thus obtained.

The molding method of the mixed powder employed may be a known method such as a press molding method, and examples thereof may include a die press molding method, a cold isostatic pressing (hereinafter also referred to as "CIP") method. As for the molding method, a plurality of methods may be employed to adjust the shape of the molded body. As the order of those methods, CIP may be performed after die press molding. In the CIP, the molded body is preferably pressed by a cold hydro-isostatic pressing method using water as a medium.

The pressure in the die press molding is preferably in a range of 5 MPa to 50 MPa, more preferably in a range of 5 MPa to 20 MPa. When the pressure in the die press molding falls within the aforementioned range, the molded body can be adjusted to a desired shape.

The pressure in the CIP treatment is preferably in a range of 50 MPa to 200 MPa, more preferably in a range of 50 MPa to 180 MPa. When the pressure in the CIP treatment falls within the aforementioned range, the density of the molded body is increased, and a molded body having a substantially uniform density on the whole can be obtained. In addition, in the following primary calcining step and secondary calcining step, the density of the obtained molded body is increased, and the light emission intensity can be improved.

Primary Calcining Step

The primary calcining step is a step of primary calcining the molded body to obtain a first sintered body. The first sintered body preferably has a relative density of 98.0% or more, more preferably 98.5% or more, even more preferably 99.0% or more. By enhancing the sintered density of the rare earth aluminate fluorescent material and the aluminum oxide contained in the molded body through the primary calcining step, the density of the sintered body can be further enhanced through secondary calcining after the primary calcining. The relative density of the first sintered body can be calculated based on the calculation formulae (1) to (3), by replacing the "ceramic complex" with the "first sintered body" in the calculation formulae (1) to (3).

The primary calcining is preferably performed under an oxygen-containing atmosphere. The oxygen-containing atmosphere is an atmosphere containing at least oxygen, and the oxygen concentration contained in the atmosphere may be 5% by volume or more, preferably 10% by volume or more, more preferably 15% by volume or more. The oxygen-containing atmosphere for primary calcining is preferably an atmospheric (the oxygen concentration is about 20% by volume) atmosphere. By primary calcining the molded body in the oxygen-containing atmosphere, discoloration to black on the molded body, which is considered to be caused by deterioration of the rare earth aluminate fluorescent material due to calcining, can be restored.

The temperature in primary calcining is preferably in a range of 1,200° C. or more and 1,800° C. or less, more preferably in a range of 1,500° C. or more and 1,800° C. or less, even more preferably in a range of 1,500° C. or more and 1,650° C. or less. When the temperature in primary calcining is 1,200° C. or more, the sintered density of the sintered body is enhanced, and the density of the second sintered body can be further enhanced through secondary calcining after primary calcining. When the temperature in primary calcining is 1,800° C. or less, the sintered body can be formed without melting the mold body.

Secondary Calcining Step

The secondary calcining step is a step of subjecting the first sintered body to a hot isostatic pressing (HIP) treatment (hereinafter also referred to as "HIP treatment") to obtain a second sintered body. By performing the HIP treatment in the secondary calcining step, voids contained in the first sintered body can be more reduced, and the density of the second sintered body can be thus enhanced.

The secondary calcining is preferably performed under an inert gas atmosphere. Since the secondary calcining is performed by the HIP treatment, a pressure medium for the HIP treatment is preferably an inert gas atmosphere. The inert gas atmosphere means an atmosphere containing argon, helium, nitrogen as main components. The expression that an atmosphere containing argon, helium, nitrogen as main components means that the atmosphere contains 50% by volume or more of at least one gas selected from the group consisting of argon, helium, and nitrogen. The oxygen concentration in the inert gas atmosphere is preferably 3% by volume or less, more preferably 1% by volume or less.

The pressure in the HIP treatment for secondary calcining is preferably in a range of 50 MPa or more and 300 MPa or less, more preferably in a range of 80 MPa or more and 200 MPa or less. When the pressure in the HIP treatment falls within the aforementioned range, the density of the sintered body on the whole can be uniformly enhanced while maintaining the crystal structure of the rare earth aluminate fluorescent material.

The temperature in secondary calcining is preferably in a range of 1,500° C. or more and 1,800° C. or less, more preferably in a range of 1,500° C. or more and 1,700° C. or less, even more preferably in a range of 1,500° C. or more and 1,650° C. or less. When the temperature in secondary calcining is 1,500° C. or more, the sintered density of the sintered body can be enhanced. When the temperature in secondary calcining is 1,800° C. or less, the sintered body can be formed without melting the mold body.

The second sintered body obtained by second calcining can be used as a ceramic complex. The second sintered body preferably has a relative density of 99.0% or more. The relative density of the second sintered body is more preferably 99.5% or more, even more preferably 99.6% or more, still more preferably 99.7% or more. The relative density of the second sintered body may be 100%, or may be 99.9% or less. The relative density of the second sintered body can be calculated based on the calculation formulae (1) to (3), by replacing the "ceramic complex" with the "second sintered body" in the calculation formulae (1) to (3).

Processing Step

The method for producing a ceramic complex may include a processing step of processing the resulting ceramic complex. Examples of the processing step may include a step of cutting the resulting second sintered body into a desired size. A known method can be utilized for the method for cutting the second sintered body, and examples thereof may include blade dicing, laser dicing, wire sawing. Among others, wire sawing is preferred since the cut surface becomes flat with high accuracy. By the processing step, a ceramic complex having a desired thickness and size can be obtained. The thickness of the ceramic complex is not particularly limited, but is preferably in a range of 1 μm or more and 1 mm or less, more preferably in a range of 10 μm or more and 800 μm or less, even more preferably in a range of 50 μm or more and 500 μm or less, still more preferably in a range of 100 μm or more and 300 μm or less in consideration of the mechanical strength and the efficiency of wavelength conversion.

The method for producing a ceramic complex according to a second embodiment preferably includes, after obtaining the second sintered body, annealing the second sintered body under an oxygen-containing atmosphere.

Figure 2:
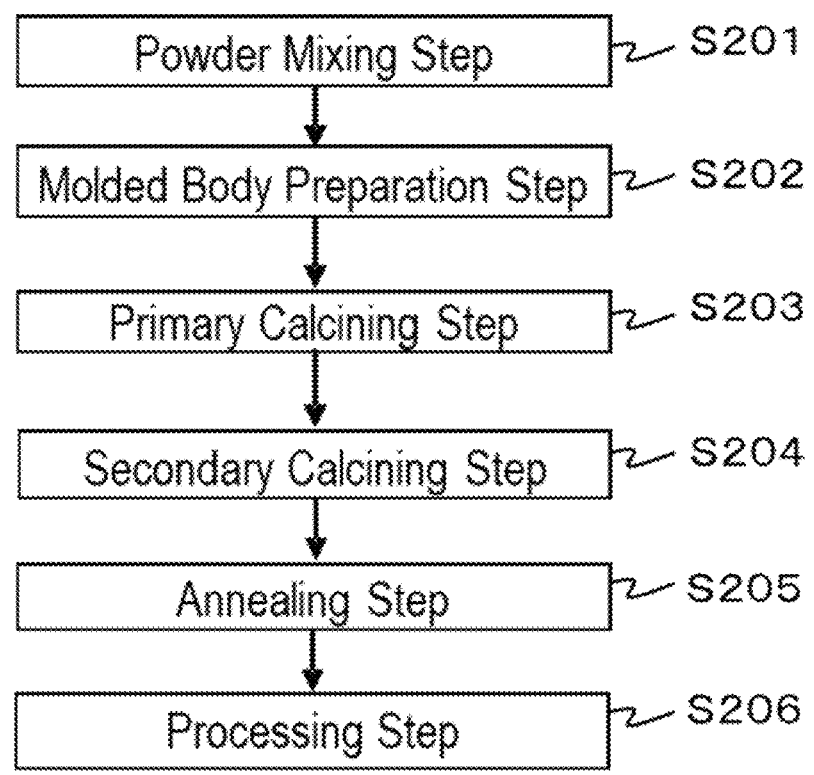
FIG. 2 is a flowchart describing an order of process steps of a method for producing a ceramic complex according to a second embodiment of the present disclosure.

FIG. 2 is a flowchart describing one example of a step order of the method for producing a ceramic complex according to the second embodiment. Steps in the method for producing a ceramic complex will be described by reference to FIG. 2. The method for producing a ceramic complex includes a molded body preparation step S202, a primary calcining step S203, a secondary calcining step S204, and an annealing step S205. The method for producing a ceramic complex may include a powder mixing step S201 prior to the molded body preparation step S202, and may include a processing step S206 of processing the ceramic complex after the annealing step S205.

Annealing Step

The annealing step is a step of annealing the second sintered body under an oxygen-containing atmosphere after the secondary calcining step to obtain an annealing treated product. Here, the processing step may be performed after the annealing step. As for the second sintered body in which the density is enhanced in the secondary calcining step, the body color may be changed to black or brown due to impurity elements, such as Fe and Na, or the body color may be blackish by the change of the composition ratio of oxygen, which is one of constituent elements of the rare earth aluminate fluorescent material, in the secondary calcining step. In the case where the body color becomes blackish by the change of the composition ratio of oxygen in the rare earth aluminate fluorescent material, the body color can be restored to the original body color of the rare earth aluminate fluorescent material through the annealing step without reducing the density of the sintered body enhanced in the secondary calcining step. The annealing treated product obtained after the annealing step can be used as a ceramic complex. The annealing treated product to be used as a ceramic complex has an original body color of the rare earth aluminate fluorescent material and has smaller black regions, which absorb light, and thus the light emission intensity can be enhanced. Here, the part where a part of or the whole of the ceramic complex is discolored to black or brown due to the existence of Na and Fe in the ceramic complex may not be restored even by performing the annealing treatment.

Annealing is performed under an oxygen-containing atmosphere. The oxygen-containing atmosphere is an atmosphere containing at least oxygen, and the oxygen concentration contained in the atmosphere may be 5% by volume or more, preferably 10% by volume or more, more preferably 15% by volume or more. The annealing is preferably performed under an atmospheric (the oxygen concentration is about 20% by volume) atmosphere.

The temperature in annealing is preferably in a range of 1,200° C. or more and 1,700° C. or less, more preferably in a range of 1,500° C. or more and 1,700° C. or less, even more preferably in a range of 1,500° C. or more and 1,600° C. or less. When the temperature in annealing is in a range of 1,200° C. or more and 1,700° C. or less, the crystal structure of the second sintered body is maintained without reducing the density of the second sintered body, and the dark blackish color of the second sintered body can be restored to the original body color of the rare earth aluminate fluorescent material.

As for the ceramic complex, in a base material composed of the melted aluminum oxide, the rare earth aluminate fluorescent material which is distinguished from the base material of the aluminum oxide by the grain boundary may exist, and the ceramic complex may be constituted through integration of the rare earth aluminate fluorescent material with the aluminum oxide. Owing to the relative density of the ceramic complex being 99.0% or more, the ceramic complex may not be cracked or broken even when the ceramic complex is subjected to processing, such as cutting, and in the case of using the ceramic complex for a light emitting device, the occurrence of color unevenness can be thus suppressed.

In combination with a light emitting element, the ceramic complex according to the present disclosure converts light emitted from the light emitting element, and is able to constitute a light emitting device that emits mixed light of the light from the light emitting element and light of which the wavelength is converted by the rare earth aluminate fluorescent material contained in the ceramic complex. As the light emitting element, for example, a light emitting element that emits light in a wavelength range of 350 nm or more and 500 nm or less can be used. For example, a semiconductor light emitting element using a nitride-based semiconductor ($In_XAl_YGa_{1-X-Y}N$, $0 \leq X$, $0 \leq Y$, $X+Y \leq 1$) can be used as the light emitting element. Using a semiconductor light emitting element as an excitation light source enables a high efficiency stable light emitting device that has high linearity of output relative to input and is resistant to mechanical shock to be obtained.

EXAMPLES

The present disclosure is hereunder specifically described by reference to the following Examples. The present disclosure is not limited to these Examples.

Production Examples of Rare Earth Aluminate Fluorescent Material

Yttrium oxide ($Y_2O_3$), gadolinium oxide ($Gd_2O_3$), cerium oxide ($CeO_2$), and aluminum oxide ($AL_2O_3$) were respectively weighed in a molar ratio (Y:Gd:Ce:Al) of 0.934×3:0.057×3:0.009×3:5 to form a raw material mixture; and barium fluoride ($BaF_2$) was added thereto as a flux; and the raw material mixture and the flux were mixed using a ball mill. The mixture was put into an alumina crucible and calcined at a temperature in a range of 1,400° C. to 1,600° C. for 10 hours in a reducing atmosphere to obtain a calcined product. The resulting calcined product was dispersed in pure water, and passed through a wet-type sieve while allowing a solvent to flow and applying various vibrations through the sieve. Subsequently, the resulting product was dehydrated and dried, and then passed through a dry-type sieve to undergo classification, thereby preparing a rare earth aluminate fluorescent material having a desired composition represented by $(Y_{0.934}Gd_{0.057}Ce_{0.009})_3Al_5O_{12}$ to be used in each of Examples 1 to 2 and Comparative Examples 1 to 2. The parameter a and the average particle diameter in the rare earth aluminate fluorescent material represented by $(Y_{0.934}Gd0.057Ce_{0.009})_3Al_5O_{12}$ were measured by the following methods. The average particle diameter of the rare earth aluminate fluorescent material was 15 μm. In the case of expressing the composition of 1 mol of the rare earth aluminate fluorescent material by the formula (I), the parameter a representing the activation amount of Ce was 0.009, and the molar ratio of Ce in 1 mol of the rare earth aluminate fluorescent material was the product of 0.009 and 3.

Average Particle Diameter

The volume average particle size (median diameter) of the resulting fluorescent material where the volume cumulative frequency from the small diameter side measured by a laser diffraction scattering particle size distribution measuring method (product name: Mastersizer 3000, manufactured by Malvern Instruments Ltd.) reached 50% was employed as the average particle size.

Elemental Analysis of Fluorescent Material

With respect to the obtained fluorescent material, a mass percentage (% by mass) of each of elements (Y, Gd, Ce, and Al), exclusive of oxygen, constituting the rare earth aluminate fluorescent material was measured using an inductively coupled plasma atomic emission spectroscopy (ICP-AES, manufactured by PerkinElmer Inc.), and the molar ratio of each element in 1 mol of the rare earth aluminate fluorescent material having a composition represented by the formula (I) was calculated from the value of the mass percentage of each element. The product of the parameter a and 3 is a molar ratio of Ce in 1 mol of the chemical composition of the rare earth aluminate fluorescent material represented by the formula (I), and the molar ratio of Ce is, when the measured molar ratio of Al is defined as 5, a value calculated based on the molar ratio of Al of 5.

Elemental Analysis of Aluminum Oxide

Each of the aluminum oxide particles A used in Examples 1 to 2 as described later and the aluminum oxide particles B used in Comparative Examples 1 to 2 as described later was melted in a sulfuric acid solution, and then the contents (ppm by mass) of sodium (Na), silicon (Si), iron (Fe), and gallium (Ga) contained in the aluminum oxide with respect to the total amount of each aluminum oxide were measured using an inductively coupled plasma atomic emission spectroscopy (ICP-AES, type: Optima 4300DV, manufactured by PerkinElmer Inc.). The results are shown in Table 1.

Purity of Aluminum Oxide

The purities of the aluminum oxide particles A and B used in Examples 1 to 2 and Comparative Examples 1 to 2 were calculated based on the calculation formula (a). The results are shown in Table 1.

TABLE 1

|  | Purity (% by mass) | Content (ppm by mass) | | | |
| --- | --- | --- | --- | --- | --- |
|  |  | Na | Si | Fe | Ga |
| Aluminum Oxide Particles A | 99.7 | <5 | <5 | 2 | <5 |
| Aluminum Oxide Particles B | 99.5 | 22 | 12 | 3 | 12 |

Example 1

15 parts by mass of the rare earth aluminate fluorescent material, which was represented by $(Y_{0.934}Gd_{0.057}Ce_{0.009})_3Al_5O_{12}$, having an average particle diameter of 15 μm and 85 parts by mass of the aluminum oxide particles A having an average particle diameter of 0.40 μm were weighed and mixed using a dry-type ball mill, thereby preparing a mixed powder for molded body. After removing balls used as a mixing medium from the mixed powder, the mixed powder was filled into a die, and a cylindrical molded body having a diameter of 20 mm and a thickness of 20 mm was formed at a pressure of 19.6 MPa (200 kgf/cm²). The resulting molded body was put in a packing container and vacuum packaged, followed by undergoing a cold hydro-isostatic pressing (CIP) treatment at 176 MPa by using a CIP apparatus (manufactured by Kobe Steel Ltd.). The resulting molded body was primary calcined while maintaining a temperature of 1,700° C. for 6 hours in an atmospheric atmosphere (oxygen concentration: about 20% by volume) by using a calcining furnace (manufactured by Marusho Denki Co., Ltd.) to obtain a first sintered body. The resulting first sintered body was secondary calcined by applying a hot isostatic pressing (HIP) treatment at 1,750° C. and at 195 MPa for 2 hours by using a HIP apparatus (manufactured by Kobe Steel, Ltd.) under a nitrogen gas atmosphere (nitrogen: 99% by volume or more) using nitrogen gas as a pressure medium, so as to obtain a second sintered body, and the second sintered body was designated as a ceramic complex. The content (% by mass) of the rare earth aluminate fluorescent material and the content (% by mass) of the aluminum oxide in the ceramic complex were respectively the same as the blending ratio (parts by mass) of the rare earth aluminate fluorescent material and the blending ratio (parts by mass) of the aluminum oxide particles when the amount of the mixed powder obtained by mixing the rare earth aluminate fluorescent material and the aluminum oxide particles was defined as 100 parts by mass.

Example 2

A second sintered body was obtained in the same manner as in Example 1 except that the temperature in primary calcining was changed to 1,650° C. and the temperature in secondary calcining was changed to 1,650° C., and the second sintered body was designated as a ceramic complex.

Comparative Example 1

15 parts by mass of the rare earth aluminate fluorescent material, which was represented by $(Y_{0.934}Gd_{0.057}Ce_{0.009})_3Al_5O_{12}$, having an average particle diameter of 15 µm and 85 parts by mass of the aluminum oxide particles B having an average particle diameter of 0.40 µm were weighed and mixed using a dry-type ball mill, thereby preparing a mixed powder for molded body. After removing balls used as a mixing medium from the mixed powder, the mixed powder was filled into a die, and a cylindrical molded body having a diameter of 20 mm and a thickness of 20 mm was formed at a pressure of 19.6 MPa (200 kgf/cm$^2$). The resulting molded body was put in a packing container and vacuum packaged, followed by undergoing a cold hydro-isostatic pressing (CIP) treatment at 176 MPa by using a CIP apparatus (manufactured by Kobe Steel Ltd.). The resulting molded body was primary calcined while maintaining a temperature of 1,700° C. for 6 hours in an atmospheric atmosphere (oxygen concentration: about 20% by volume) by using a calcining furnace (manufactured by Marusho Denki Co., Ltd.) to obtain a first sintered body. The resulting first sintered body was secondary calcined by applying a hot isostatic pressing (HIP) treatment at 1,750° C. and at 195 MPa for 2 hours by using a HIP apparatus (manufactured by Kobe Steel, Ltd.) under a nitrogen gas atmosphere (nitrogen: 99% by volume or more) using nitrogen gas as a pressure medium, so as to obtain a second sintered body, and the second sintered body was designated as a ceramic complex. The content (% by mass) of the rare earth aluminate fluorescent material and the content (% by mass) of the aluminum oxide in the ceramic complex were respectively the same as the blending ratio (parts by mass) of the rare earth aluminate fluorescent material and the blending ratio (parts by mass) of the aluminum oxide particles when the amount of the mixed powder obtained by mixing the rare earth aluminate fluorescent material and the aluminum oxide particles was defined as 100 parts by mass.

Comparative Example 2

A second sintered body was obtained in the same manner as in Comparative Example 1 except that the temperature in primary calcining was changed to 1,650° C. and the temperature in secondary calcining was changed to 1,650° C., and the second sintered body was designated as a ceramic complex.

Measurement of Relative Densities of First Sintered Body and Ceramic Complex

The relative densities of the first sintered body and the ceramic complex, which was the second sintered body, in each of Examples 1 to 2 and Comparative Examples 1 to 2 were measured. The relative density of the first sintered body was measured based on the calculation formulae (1) to (3), by replacing the "ceramic complex" with the "first sintered body" in the calculation formulae (1) to (3). The results are shown in Table 2. In the calculation formula (2), the true density of the aluminum oxide particles A used in each of Examples 1 to 2 was 3.98 g/cm$^3$, the true density of the aluminum oxide particles B used in each of Comparative Examples 1 to 2 was 3.98 g/cm$^3$, and the true density of the rare earth aluminate fluorescent material used in each of Examples 1 to 2 and Comparative Examples 1 to 2 was 4.67 g/cm$^3$.

Measurement of Relative Light Emission Intensity

The ceramic complex in each of Examples 1 to 2 and Comparative Examples 1 to 2 was cut into a piece having a thickness of 240 µm with a wire saw to form a sample. The sample of the ceramic complex in each of Examples and Comparative Examples was irradiated with light emitted from a nitride semiconductor LED chip with a light emission peak wavelength of 455 nm used as a light source, and the light emission intensity at the light emission peak wavelength in a wavelength range of 430 nm or more and 800 nm or less obtained from the sample of the ceramic complex in each of Examples and Comparative Examples irradiated with light from the light source was measured using a fluorospectrophotometer. The light emission intensity at the light emission peak wavelength in a wavelength range of 430 nm or more and 800 nm or less obtained from each sample was represented as a relative light emission intensity (%) when the light emission intensity at the light emission peak wavelength in a wavelength range of 430 nm or more and 800 nm or less obtained from the sample of the ceramic complex in Comparative Example 1 was defined as 100%. The results are shown in Table 2.

TABLE 2

| | Content of Aluminum Oxide (% by mass) | Content of Fluorescent Material (% by mass) | Calcining Temperature of First Sintered Body (° C.) | Relative Density of First Sintered Body (%) | Calcining Temperature of Second Sintered Body (° C.) | Relative Density of Second Sintered body (%) | Relative Light Emission Intensity (%) |
|---|---|---|---|---|---|---|---|
| Example 1 | 85 | 15 | 1700 | 99.0 | 1750 | 99.9 | 104 |
| Example 2 | 85 | 15 | 1650 | 99.0 | 1650 | 99.9 | 110 |
| Comparative Example 1 | 85 | 15 | 1700 | 97.6 | 1750 | 99.0 | 100 |
| Comparative Example 2 | 85 | 15 | 1650 | 97.3 | 1650 | 98.8 | 103 |

Elemental Analysis of Ceramic Complex

Each of the ceramic complexes used in Examples 1 to 2 and Comparative Examples 1 to 2 was melted in a phosphoric acid solution while heating, and then the contents (ppm by mass) of sodium (Na), silicon (Si), iron (Fe), and gallium (Ga) contained in the ceramic complex with respect to the total amount of the ceramic complexes in Examples and Comparative Examples were measured using an inductively coupled plasma atomic emission spectroscopy (ICP-AES, type: Optima 4300DV, manufactured by PerkinElmer Inc.). The results are shown in Table 3.

TABLE 3

| | Content (ppm by mass) | | | |
|---|---|---|---|---|
| | Na | Si | Fe | Ga |
| Example 1 | <5 | <5 | <2 | <5 |
| Example 2 | <5 | <5 | <2 | <5 |
| Comparative Example 1 | 18 | 7 | 2 | 8 |
| Comparative Example 2 | 18 | 7 | 2 | 8 |

In each of the ceramic complexes of Examples 1 and 2, the content of Na was less than 5 ppm by mass, the content of Si was less than 5 ppm by mass, the content of Fe was less than 2 ppm by mass, and the content of Ga was less than 5 ppm by mass, relative to the total amount of the rare earth aluminate fluorescent material having a composition represented by the formula (I) and the aluminum oxide; and the relative light emission intensity in each of the ceramic complexes of Examples 1 and 2 was higher than that in each of the ceramic complexes of Comparative Examples 1 and 2. The inequality sign "<" in Table 3 means that the content (ppm by mass) of each element is a value less than the number described in the right side of the inequality sign.

In each of the ceramic complexes of Comparative Examples 1 and 2, the content of Fe was 2 ppm by mass, but the content of Na was 18 ppm by mass, the content of Si was 7 ppm by mass, and the content of Ga was 8 ppm by mass, relative to the total amount of the rare earth aluminate fluorescent material having a composition represented by the formula (I) and the aluminum oxide. The contents of Na, Si, and Ga in each of the ceramic complexes of Comparative Examples 1 and 2 were larger than those in each of the ceramic complexes of Examples 1 and 2; and the relative light emission intensity in each of the ceramic complexes of Comparative Examples 1 and 2 was lower than that in each of the ceramic complexes of Examples 1 and 2. One of the reasons where the relative light emission intensity was lowered was presumed as follows. In each of the ceramic complexes of Comparative Examples 1 and 2, the content of Si contained in the ceramic complex, which was 7 ppm by mass, was smaller than the content of Si contained in the aluminum oxide particles B serving as the raw material, which was 12 ppm by mass. Thus, Si was reacted with the rare earth aluminate fluorescent material contained in the ceramic complex, and at least a part of the rare earth aluminate fluorescent material was changed to a rare earth silicate represented by, for example, $Ln_2SiO_5$ or $Ln_2Si_2O_7$ as described above, thereby lowering the light emission intensity. In addition, it was presumed that, in each of the ceramic complexes of Comparative Examples 1 and 2, the content of Ga contained in the ceramic complex, which was 8 ppm by mass, was smaller than the content of Ga contained in the aluminum oxide particles B serving as the raw material, which was 12 ppm by mass, and Ga was replaced with Al of the rare earth aluminate fluorescent material contained in the ceramic complex. Thus, the ceramic complex having a desired color tone could not be obtained.

Photograph of External Appearance

Figure 3:
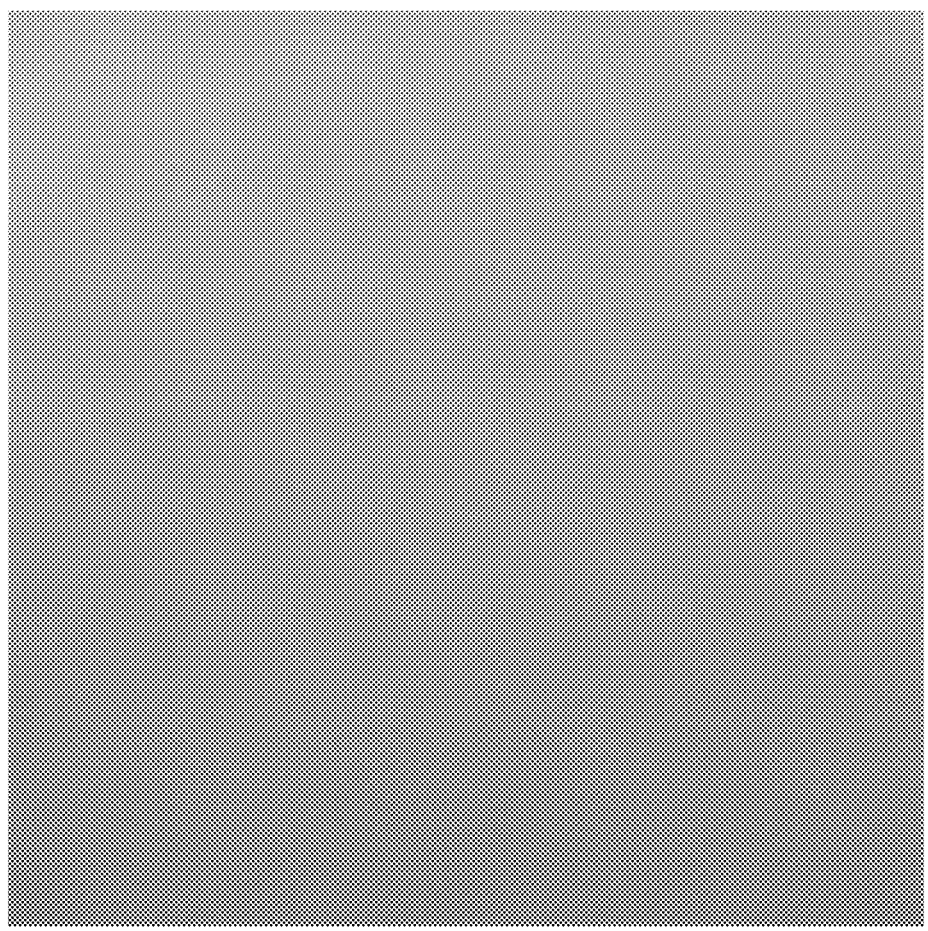
FIG. 3 is a photograph of external appearance obtained by enlarging a part of a ceramic complex according to Example 1.

A photograph of external appearance of each of the ceramic complex in Example 1 and the ceramic complex in Comparative Example 1 was obtained. FIG. 3 is a photograph of external appearance of the ceramic complex in Example 1, and FIG. 4 is a photograph of external appearance of the ceramic complex in Comparative Example 1.

As seen from the photograph of external appearance in FIG. 3, the ceramic complex in Example 1 maintained the body color of the rare earth aluminate fluorescent material and did not discolor to black or brown.

Figure 4:
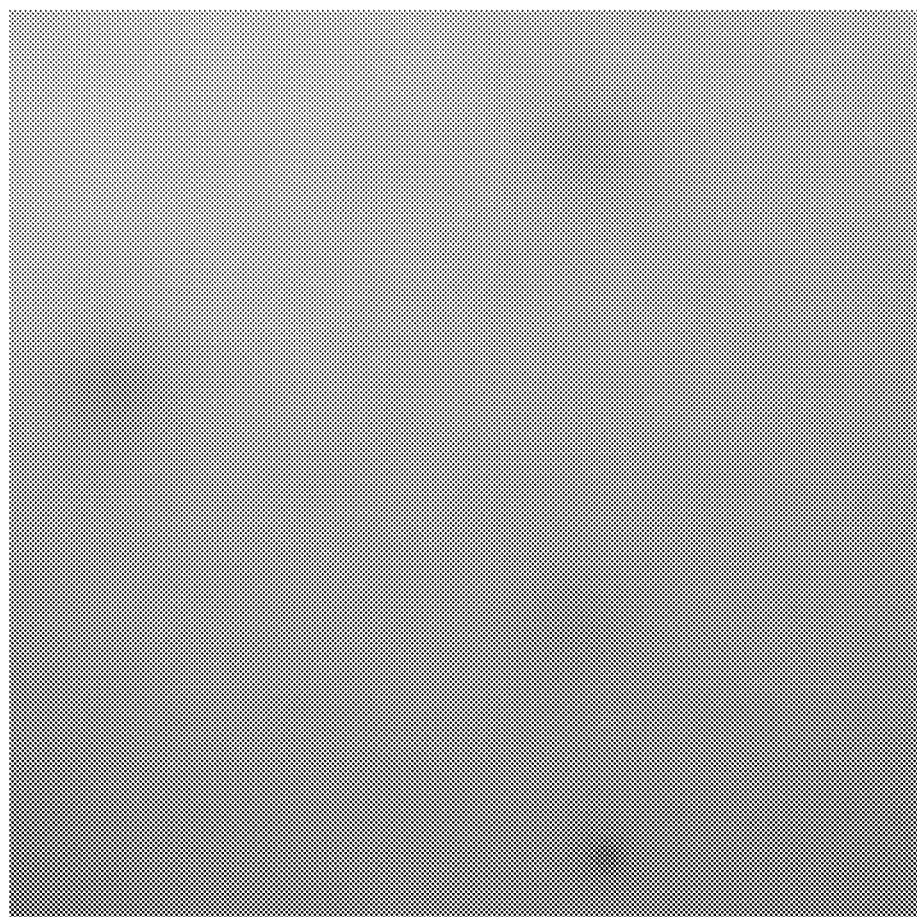
FIG. 4 is a photograph of external appearance obtained by enlarging a part of a ceramic complex according to Comparative Example 1.

As seen from the photograph of external appearance in FIG. 4, a part of the body color of the ceramic complex in Comparative Example 1 was changed to black or brown in the form of spots. The reason why the body color was changed in the form of spots was presumed as follows. Although the content of Fe in each of the ceramic complexes of Comparative Examples 1 and 2 was 2 ppm by mass and was the same degree as that in each of the ceramic complexes of Examples 1 and 2, the content of Na in each of the ceramic complexes of Comparative Examples 1 and 2 was 18 ppm and was larger than that in each of the ceramic complexes of Examples 1 and 2. Thus, the Na element was aggregated at the part where the Fe element was existed in the ceramic complex, and a part of the ceramic complex was discolored to black or brown in the form of spots.

In combination with a light emitting element such as an LED or an LD, the ceramic complex according to the present disclosure can be utilized for illumination devices for on-vehicle and ordinary lighting, backlights of liquid crystal display devices, and materials for solid scintillators.

The invention claimed is:

1. A ceramic complex, comprising:
a rare earth aluminate fluorescent material having a composition represented by the following formula (I), and an aluminum oxide, $$(Ln_{1-a}Ce_a)_3Al_5O_{12} \quad (I)$$

wherein Ln represents at least one element selected from the group consisting of Y, Gd, Lu, and Tb; and a satisfies 0<a≤0.022,
wherein a content of the aluminum oxide is 70% by mass or more relative to a total amount of the rare earth aluminate fluorescent material having a composition represented by the formula (I) and the aluminum oxide, and
wherein a content of Na is 7 ppm by mass or less, a content of Si is 5 ppm by mass or less, a content of Fe is 3 ppm by mass or less, and a content of Ga is 5 pm by mass or less, relative to a total amount of the rare earth aluminate fluorescent material having a composition represented by the formula (I) and the aluminum oxide.

2. The ceramic complex according to claim 1, wherein a purity of the aluminum oxide is 99.6% by mass or more.

3. The ceramic complex according to claim 1, wherein a relative density of the ceramic complex is 99.0% or more.

4. A method for producing a ceramic complex, comprising:
preparing a molded body containing a rare earth aluminate fluorescent material having a composition represented by the following formula (I) and an aluminum oxide, wherein a content of Na in the aluminum oxide is 7 ppm by mass or less, a content of Si in the aluminum oxide is 5 ppm by mass or less, a content of Fe in the aluminum oxide is 3 ppm by mass or less, and a content of Ga in the aluminum oxide is 5 ppm by mass or less; and
calcining the molded body at a temperature in a range of 1,200° C. or more and 1,800° C. or less to obtain a sintered body:

$$(Ln_{1-a}Ce_a)_3Al_5O_{12} \quad (I)$$

wherein Ln represents at least one element selected from the group consisting of Y, Gd, Lu, and Tb; and a satisfies $0<a\leq0.022$.

5. The method for producing a ceramic complex according to claim 4, comprising:
   primary calcining the molded body at a temperature in a range of 1,200° C. or more and 1,800° C. or less to obtain a first sintered body; and
   secondary calcining the first sintered body by applying a hot isostatic pressing (HIP) treatment at a temperature in a range of 1,500° C. or more and 1,800° C. or less to obtain a second sintered body.

6. The method for producing a ceramic complex according to claim 4, wherein a content of the aluminum oxide is 70% by mass relative to a total amount of the molded body.

7. The method for producing a ceramic complex according to claim 4, wherein a purity of the aluminum oxide is 99.6% by mass or more.

8. The method for producing a ceramic complex according to claim 5, comprising annealing the second sintered body under an oxygen-containing atmosphere.

\* \* \* \* \*